R. A. MACK.
AUTOMATIC GAS CUT-OFF.
APPLICATION FILED FEB. 23, 1912.
1,028,044.
Patented May 28, 1912.
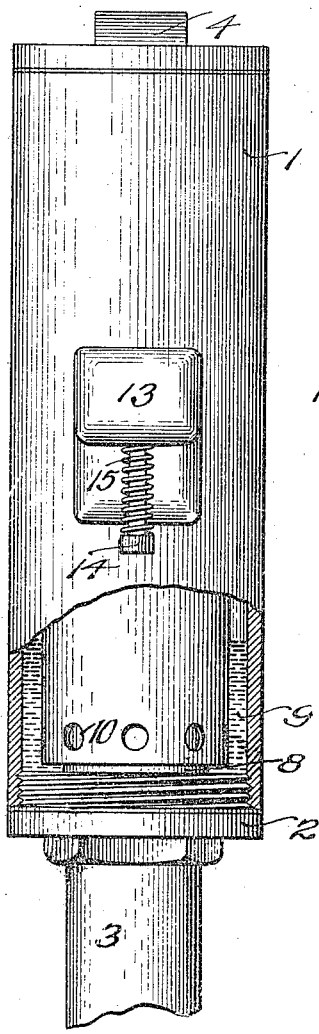
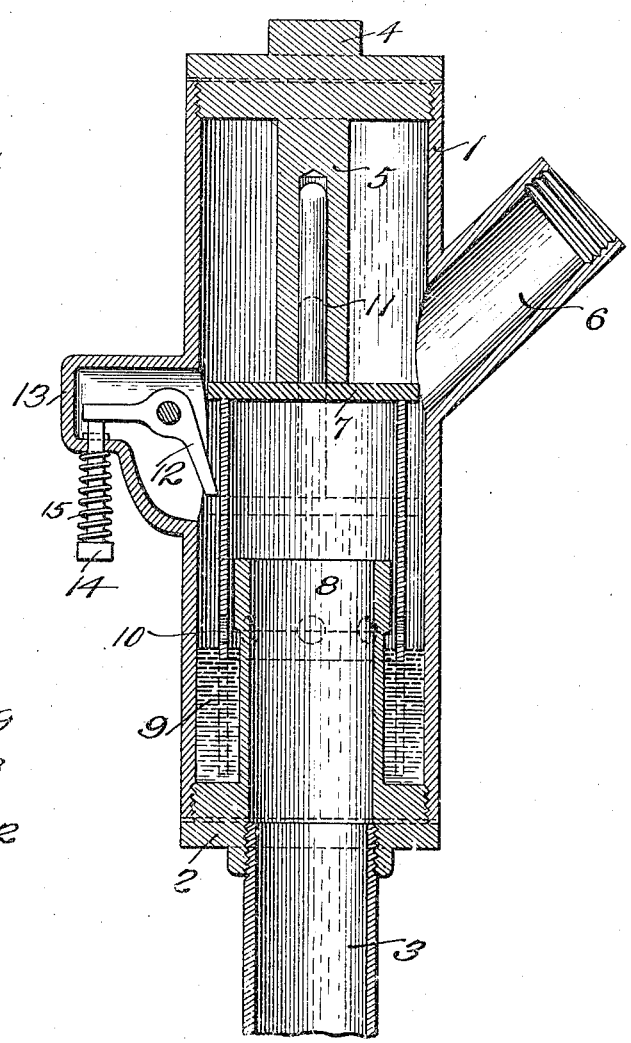

UNITED STATES PATENT OFFICE.

RUDOLPH A. MACK, OF GALLIPOLIS, OHIO.

AUTOMATIC GAS CUT-OFF.

1,028,044.    Specification of Letters Patent.    Patented May 28, 1912.

Application filed February 23, 1912. Serial No. 679,473.

*To all whom it may concern:*

Be it known that I, RUDOLPH A. MACK, a citizen of the United States, residing at Gallipolis, in the county of Gallia and State of Ohio, have invented certain new and useful Improvements in Automatic Gas Cut-Offs, of which the following is a specification.

This invention relates to automatic gas cut-offs, its primary object being to provide a device applicable to gas service pipes whereby the accidental escape of gas resulting from decrease of pressure may be effectually prevented.

As is well known, the pressure of gas supplied to buildings is subject to fluctuation due to numerous causes, and said pressure at times becomes so weak as to extinguish any burners which may have been in use under normal conditions. The pressure of the gas again becoming normal is thus permitted to escape with the disastrous results of explosions, asphyxiation, and other dangers. It is to prevent circumstances of this nature that I have designed my invention, wherein a valve normally held in operative position by normal pressure of the gas, operates to cut off the supply when said pressure becomes weakened or reduced, locking means being associated with the valve to then prevent any likelihood of flow of the gas until released by external agency cognizant of the cause of the failure hereinbefore described.

For a full understanding of the present invention, reference is to be had to the following description and the accompanying drawings, in which—

Figure 1 is a view in elevation of my device, a portion of the casing being broken away to show the valve in its inoperative position; and Fig. 2 is a vertical sectional view, showing the valve in the position assumed thereby when the gas pressure is normal.

Throughout the following detail description and on the several figures of the drawings, similar parts are referred to by like reference characters.

Referring to the drawings and specifically describing my invention, a device constructed in accordance therewith comprises a tubular member or casing 1, open at its opposite ends, and into the lower opening thereof is screwed a coupling 2, which is adapted to be screwed on to a gas supply pipe 3. The casing 1 is vertically disposed and is provided at its opposite end with a closure or cap 4 screwed thereinto and formed with a tubular guide member 5 extending within the casing 1, said guide member being also adapted to act as a stop, as will be hereinafter more fully described. At one side of the casing 1 is provided an outlet 6 and mounted within the casing, for vertical movement, is an inverted cup shaped valve 7.

The coupling 2 is formed with an integral hollow tube 8 extending a suitable distance into the casing 1 and through which the gas from the supply pipe 3 passes, exerting a pressure against the valve 7 which is arranged over said hollow tubular extension.

When the pressure of the gas in the pipe 3 is normal, the valve 7 assumes its upper raised position, shown in full lines in Fig. 2 of the drawings, said upward movement being limited by the stop 5. When, however, the pressure of the gas, for any reason, becomes weakened the valve 7 descends over the tubular extension 8 until the lower sides of the valve 7 are immersed in the liquid designated at 9, said liquid being preferably mercury. Adjacent the lower portion of the sides of the valve 7 are provided a plurality of openings 10 through which the gas passes into the casing 1 when said valve is in its normal position. So long as said valve is at its upward position, the gas is permitted to flow through the outlet 6, as customary, which outlet may be connected either above or below the gas meter.

By the provision of the openings 10 in the valve 7, it is possible for said valve to permit the flow of the gas through the outlet 6 notwithstanding that the lower end of the valve is immersed in the sealing fluid shown at 9. The above arrangement affords an advantage in that the mechanism of the invention is rendered more sensitive, there being no tendency on the part of the liquid 9 to resist the initial lowering movement of the valve when the pressure thereagainst is relieved, as hereinafter more fully referred to.

The reciprocating movements of the valve are preferably guided by means of a rod 11 extending upwardly from the top of the valve 7 and into the tubular guide member 5. It will be evident, however, that said rod 11 may be dispensed with without in any way affecting the operation of my device.

To prevent the valve 7 from movement which will permit the gas to escape after the pressure has been reduced, I provide a locking lever 12 pivotally mounted in a hollow extension 13 of the casing 1. As will be evident, when the valve passes the extremity of the lever 12, said lever will engage over the top portion of the valve and prevent upward movement thereof. The lever 12 is formed with an integral arm 12', against which a headed pin 14, having mounted thereon the spring 15, projects, the tendency of the spring 15 being to hold the pin retracted.

The hollow extension 13 may be said to be of somewhat inverted L-form in cross section and since the pressure pin 14 is normally held retracted, the arm 12' of the lever 12 is free to have a slight upward movement as the valve 7 drops until the upper end of the valve passes the engaging end of the lever 12, whereupon the member 14 constitutes a stop to resist any tendency of the valve to return to its normal position. Under these conditions, the pin 14 performs a dual function in a manner which will be readily evident. By reason of the location of the hollow member 13 at one side of the casing 1, it will be apparent that the internal parts of the device may be readily removed without interference with the locking means described and comprising the parts 12, 14 and 15.

In order that the valve may become operative it is only necessary to press the pin 14 inwardly to disengage the lever 12 from the valve 7, which will immediately assume its upper position if the pressure of gas is normal.

As will be apparent, changes may be made in the form of construction of my device without departing from the spirit of the invention and within the scope of the claims hereto appended.

Having thus described the invention, what is claimed as new is:

1. An automatic gas cut-off comprising a casing having an outlet leading therefrom, a closure for one end of the casing provided with a hollow extension projecting into the casing some distance, a valve freely movable in the casing and adapted to receive therein said hollow extension, a liquid contained in the casing and adapted to establish a liquid seal between the valve and said hollow extension, said casing being provided with a hollow extension projecting from one side of the same, a lever mounted in said hollow extension and having one end arranged to engage over the valve to lock the same from movement, said lever having an arm at its other end extending outwardly into the last mentioned hollow extension, a pressure pin carried by the last mentioned hollow extension and arranged to engage the arm aforesaid to release the valve from the lever, and means coöperating with the pin to hold the latter in a retracted position, permitting slight movement of the lever to assume a locking position in respect to the valve, said pin further constituting a stop to prevent a releasing movement of the lever in respect to the valve after the latter has once become locked.

2. An automatic gas cut-off, the same comprising a hollow casing, a closure at the lower end of said casing having a tubular extension projecting upwardly therefrom, a hollow valve mounted in the casing and adapted to receive said extension therein, said casing having an outlet above the valve and being formed at one side with a hollow extension projecting therefrom and of somewhat L-form in cross section, a locking lever pivoted in the last mentioned hollow extension and having one end adapted to engage over the valve to lock the same from movement when the valve assumes an abnormal position, said lever having an arm projecting outwardly into the outermost portion of the last mentioned hollow extension, a pressure pin mounted on the hollow extension aforesaid with its inner end arranged to engage the arm to press the same upwardly and thus release the valve, and a spring coöperating to hold the pressure pin retracted at the outer limit of its movement and in a position permitting a slight movement of the locking lever to assume a locking position and to form a stop preventing movement of the locking lever after it has once lockingly engaged the valve.

In testimony whereof I affix my signature in presence of two witnesses.

RUDOLPH A. MACK.

Witnesses:
JASPER C. INGELS,
FRANK S. GATES.